T. H. HILL.
THILL COUPLING.
APPLICATION FILED OCT. 17, 1913.
1,116,064.
Patented Nov. 3, 1914.
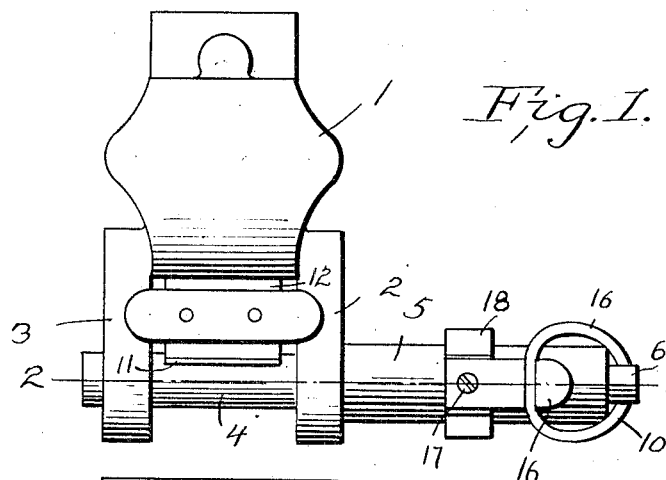
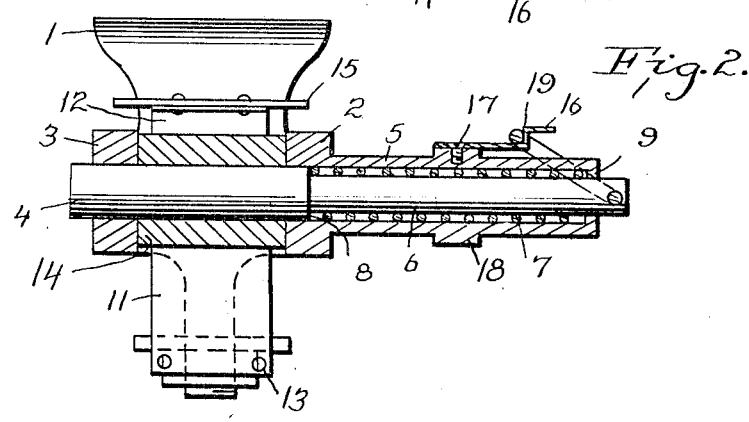
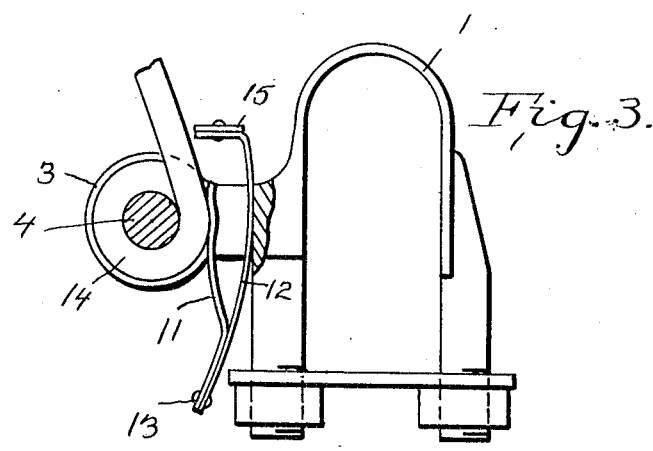

UNITED STATES PATENT OFFICE.

THOMAS H. HILL, OF WINSTED, CONNECTICUT.

THILL-COUPLING.

1,116,064.

Specification of Letters Patent.

Patented Nov. 3, 1914.

Application filed October 17, 1913. Serial No. 795,759.

*To all whom it may concern:*

Be it known that I, THOMAS HENRY HILL, a citizen of the United States, residing at Winsted, in the county of Litchfield and State of Connecticut, have invented certain new and useful Improvements in Thill-Couplings; and I do hereby declare the following to be a full, clear, and exact description of the invention, such as will enable others skilled in the art to which it appertains to make and use the same.

My invention relates to new and useful improvements in thill couplings and resides in the provision of a thill coupling which will enable draft poles, or shafts to be readily attached to and removed from running gear of vehicles without the necessity of screw bolts or wrenches.

An important object of the invention is to provide a device such as described which will permit an expeditious coupling of vehicle shafts to vehicle running gear and is so arranged as to prevent rattling of the coupled parts.

A still further object of the invention is to provide a device such as described which is simple as to construction and arrangement of parts and cheap to manufacture.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention, Figure 1 is a top plan view of the coupling in assembled position. Fig. 2 is a longitudinal section taken on line 2—2 of Fig. 1 particularly illustrating the coupling pin and the means for locking it in closed position, and Fig. 3 is a side elevation illustrating the coupling pin in section and inserted through the shaft eye.

Referring to the drawings by numerals 1 designates as an entirety a U-shaped axle clip of the ordinary type which is adapted to be attached to the front axle of the vehicle.

A pair of laterally extending arms 2 and 3 are carried by the clip 1 adjacent one side thereof in spaced relation to each other and are adapted to support a coupling pin 4 which will be hereinafter more fully described. A cylindrical sleeve 5 is carried by the arm 2 and extends outwardly and laterally therefrom at right angles thereto. The coupling pin 4 is mounted within the cylindrical sleeve 5 and extends through openings formed in the terminals of the arms 2 and 3 as will be clearly seen with reference to Fig. 2 in the drawings.

The coupling pin 4 is slidably mounted within the cylindrical sleeve 5 and arms 2 and 3 and is reduced for approximately half its length as at 6. This reduced portion 6 is adapted to have mounted thereon a helical expansion spring 7 adapted for engagement at one terminal with the shoulder 8 formed at the point of the reduction of the pin 4, and at its other terminal with an inwardly extending annular flange 9 formed integral with the outer terminal of the cylindrical sleeve 5 as will be clearly seen with reference to Fig. 2 in the drawings. A ring 10 is carried upon the free terminal of the reduced portion 6 of the coupling pin 4 and serves to limit the inward movement of the pin relative to the cylindrical sleeve 5. The anti-rattling means forming a part of the invention consists of two flat sections of spring metal 11 and 12 respectively that are secured at their terminals as at 13 and arranged so that they are disposed between the shaft eyes 14 and the adjacent outer wall of the clip 1. The section 11 engages the eye 14 and the section 12 bears against the outer face of the clip 1. A plate 15 is carried by the upper terminal of the spring 12 transversely thereof and is adapted to engage the arms 2 and 3 and limit the movement of the springs relative to the arms upon the downward movement of the spring.

As a means for locking the coupling pin 4 in coupled position there has been provided a spring catch 16 that is secured at one terminal by means of a bolt, screw or other suitable fastening means 17 to an approximately annular flange 18 that is formed integral with the cylindrical sleeve 5 approximately centrally of the ends thereof. The outer terminal of the spring catch 16 is bent up wardly at right angles to the body portion thereof and extends outwardly therefrom at right angles to the upwardly bent portion as at 19 thus providing a shoulder portion that is adapted for engagement with the ring 10 which is moved into engagement with the spring catch when the coupling pin 4 is in its coupled position, as will be clearly seen with reference to Figs. 1 and 2 in the drawings.

To couple the shaft, the operator grasps the ring 10 and pulls the coupling pin 4 outwardly from the arm 3 against the action of the spring 7 mounted upon the reduced portion 6 of the coupling pin, until the eye 14 may be placed between the arms 2 and 3. The coupling pin 4 is then inserted through the eye 14 and arm 3 and the shafts are coupled to the clip. The ring 10 is then moved into engagement with the spring catch 16 after the manner described and the shafts are locked in coupled relation to the running gear of the vehicle. The eye 14 is placed into engagement with the spring 11 which is sufficiently wide to provide a bearing surface, prior to the coupling action such as described, thus it will be seen that the coupled parts are held so that no rattling is had. The spring 7 is at all times housed within the cylindrical sleeve 5 owing to the fact that the ring 10 limits the movement of the coupling pin and thus the shoulder 8 on the pin is disposed within the aperture in the arm 2 and the annular flange 9 provides for engagement with the other terminal of the spring.

It is apparent that shafts or poles may be readily attached to the running gear of vehicles in a reliable and expeditious manner without the necessity of employing screw bolts, etc., and that they may be readily removed from the vehicle by simply pressing the spring catch 16 which is held in spaced relation to the cylindrical sleeve 5 by the annular flange 18 to which it is secured thus allowing the ring 10 to be moved out of engagement with the catch and the coupling pin to be pulled outwardly from coupling engagement with the eye 14.

The spring catch 16 serves to hold the ring 10 securely so that rattling thereof is prevented as well as to assist the spring 7 in holding the bolt in locked position.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:—

In a thill coupling the combination with a U-shaped axle clip of a pair of laterally extending arms carried by said clip in spaced relation to each other, a cylindrical sleeve carried by one of said arms and extending at right angles thereto, a coupling pin slidably mounted within said sleeve and extending through the arms, an expansion spring mounted within said sleeve upon said coupling pin, a ring carried upon the free terminal of said coupling pin adjacent the outer terminal of said sleeve, a flange formed centrally of the ends of said sleeve, a spring catch mounted upon said flange and having an upwardly and outwardly bent terminal, said ring adapted for engagement with the upwardly and outwardly bent terminal of the spring catch to hold said coupling pin in coupled position and anti-rattling springs interposed between the shaft eyes and the clip.

In testimony whereof I affix my signature in presence of two witnesses.

THOMAS H. HILL.

Witnesses:
JOHN J. BURKE,
GEORGE M. CARRINGTON.